Jan. 17, 1939.  J. P. RYAN  2,144,125
VALVE
Filed March 2, 1938
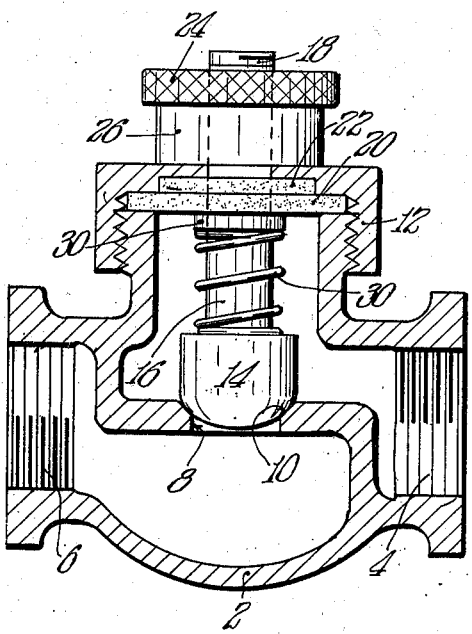
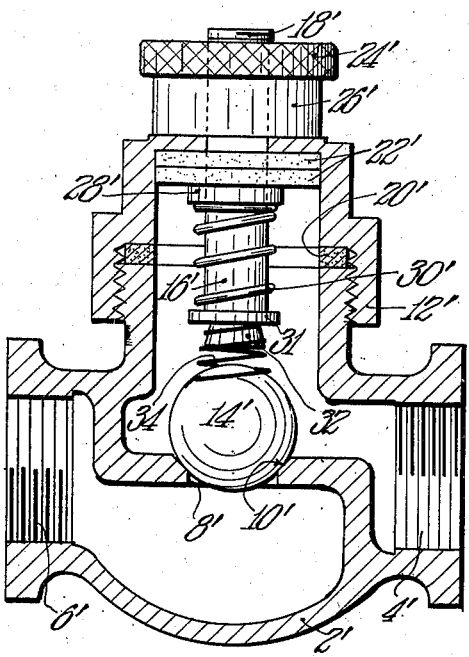
INVENTOR.
BY James P. Ryan.
Walter C. Ross.
ATTORNEY.

Patented Jan. 17, 1939

2,144,125

UNITED STATES PATENT OFFICE 2,144,125

VALVE

James P. Ryan, Easthampton, Mass., assignor to Ryan Valve Corporation, Easthampton, Mass., a corporation of Massachusetts Application March 2, 1938, Serial No. 193,529

5 Claims. (Cl. 137—162)

This invention relates to valves and is particularly directed to valves for fuel supply lines such as an oil line or the like adapted to close automatically when effected by elevated temperatures.

The principal objects of the invention are directed to the provision of a valve for use in an oil line or the like which will automatically shut off the supply of oil or other fuel due to the presence of heat in the vicinity of the said valve.

According to one special feature of the invention the valve consists of a minimum of parts so that it is simple in form and therefore economical to manufacture while at the same time is efficient in operation. The construction is such that the hum usually found in oil-burners is obviated.

According to another special feature of the invention the valve is adapted and arranged not only to automatically shut off the flow of fuel but it is so constructed as to act as a check valve and at the same time it is adapted for manual operation to open or close the line when desired.

Various novel features and advantages of the invention will be hereinafter more fully referred to in connection with the accompanying description of the preferred form of the invention reference being had to the accompanying drawing wherein:

Fig. 1 is a sectional elevational view through a valve which embodies the novel features of the invention; and Fig. 2 is a similar view of a valve embodying other novel features of the invention.

Referring now to the drawing more in detail the invention will be fully described.

The valve shown in Fig. 1 has a body 2 provided with ports 6 and 4 between which is an opening or passageway 8 having a seat 10 therearound. The valve, of course, may be connected in an oil supply line to an oil burner or the like. A cap 12 is associated with the body as by means of a screw thread, as shown.

A valve member 14 for engaging the seat 10 in closed or shut off position has a stem or spindle 16, the upper end 18 of which is preferably threaded left hand.

A packing preferably of a yieldable nature indicated by 20 is provided around the stem 16 and is arranged to be held between the cap and body. It has a part 22 of relatively less diameter which fits in a reces provided in the cap, as shown. The packing prevents leakage between the cap and body and while permitting longitudinal movements of the stem also functions to prevent leakage therepast.

A manually engageable member 24 is in threaded engagement with the threaded part of the stem and between the said members 24 and cap there is a fusible member 26 which under the influence of heat melts or softens.

A washer or collar 28 on the spindle bears against the packing washer 20 and a spring 30 is interposed between said washer or collar 28 and the valve member 14 and tends to urge the valve towards the seat.

In Fig. 1 the valve is shown in the closed position. By rotating the member 24 the stem moves upwardly so that valve 14 is elevated from off its seat against the action of the spring 30. In open position fuel may pass through the valve. The fusible member 26 is constructed of such material that in the presence of excessive heat the said member melts or softens so that the spring 30 causes valve 14 to move downwardly to engage its seat and cut off the flow of fuel.

From the foregoing description it will be observed that there is provided a simple valve construction not only to facilitate economy and ease in manufacturing but which is readily simple and one which operates efficiently.

The packing washer 20 provides means for preventing leakage past the stem as well as between the cap and body and overcomes the common objection in valves of this type where leakage is a usual occurrence and yet the packing is of such a nature that it permits the desired longitudinal movement of the spindle when it is moved to closed position by the spring or when the valve is manually opened by means of the member 24.

According to the valve in Fig. 2 there is a body 2' and ports 6' and 4' with passageway 8' between these. As in the former case there is a seat 10' around the passageway. A cap 12' is associated with the body by means of screw threads or the like and a valve member 14' is adapted for cooperating with the seat 10'. A stem 16' is reciprocable in the cap and it has an upper threaded end portion 18'. A yieldable packing 20' is provided between the cap and the body to seal the same and another packing or packings such as 22' is provided in the upper end of the cap around the spindle as shown. A manually engageable member 24' is provided which is in threaded engagement with the stem and between this and the upper side of the cap there is a cylindrical member 26' of a fusible material. A washer 28' around the stem 16' bears against the packing washer 22' and a spring 30' is interposed between said washer and an enlarged part 31 of the stem 16'. A tapering part 32 on the lower end of the stem carries a conical spring 34 which bears on the valve member 14'.

The valve member 14' in Fig. 2 is shown in normal position although the stem is in open position with its part 32 not bearing on the valve member. This is really the open position of the valve since fluid when flowing in one direction may lift said valve member against the action of spring 34 while at the same time the valve member acts as a check to the flow or backing up of fluid in an opposite direction. I find that valve 14' and spring 34 tend to eliminate the usual hum which invariably occurs in oil-burner lines.

When it is desired to close the valve the manually engageable member is rotated to lower the stem so that its lower end bears on the valve member and holds it in closed position on the seat. With the parts in the open position shown and when the valve is subjected to heat sufficient to melt or soften the fusible member the stem is moved downwardly by the spring therearound so that its lower end bears on the valve member to hold it on its seat compressing the spring on the lower end of the stem whilst doing so.

As a feature of the invention the valve construction of Fig. 2 eliminates hum in the line which now exists in the fuel supply line to an oil burner, and is very objectionable.

While I have described the invention in great detail and with respect to a present preferred form thereof, it is not desired to be limited thereto since many changes and modifications may be made therein without departing from the spirit and scope of the invention.

What is desired to claim and secure by Letters Patent of the United States is:

1. A heat responsive valve comprising in combination, a body having a passageway and a seat, a cap on said body, a valve member movable towards and away from said seat, a stem slidable in said cap, manually engageable means to slide said stem in the cap between valve closed and open positions, a spring between the inner end of the stem and said valve member to normally and yieldably hold said valve member on said seat whereby the said member acts as a check for the flow of fluid through the valve in one direction, a spring acting on the stem tending to move the same to closed position, and a fusible member between the manually engageable member and cap holding the stem against the action of the spring which when ruptured allows the stem to descend so its lower end holds the valve member in closed position.

2. A combined heat responsive and check valve comprising in combination, a body having a passageway and a seat therearound, a valve member cooperating with said seat, a cap on said body, a stem slidable in said cap between open and closed positions, a manually engageable member threadedly engaging the upper end of the spindle, a spring between said cap and lower end of the stem urging the stem towards closed position, a fusible member between said manually engageable member and cap normally holding the stem in open position against said spring, and a valve spring between the lower end of the stem and valve member whereby the said valve member acts as a check valve to the flow of fluid in one direction and when the fusible member is ruptured the stem is moved downwardly so that its lower end engages and holds said valve member against said seat.

3. A combined heat responsive and check valve comprising in combination, a body having a passageway and a seat therearound, a valve member cooperating with said seat, a cap on said body, a stem slidable in said cap between open and closed positions, a manually engageable member threadedly engaging the upper end of the spindle, a spring between said cap and lower end of the stem urging the stem towards closed position, a fusible member between said manually engageable member and cap normally holding the stem in open position against said spring, and a valve spring between the lower end of the stem and valve member whereby the said valve member acts as a check valve to the flow of fluid in one direction and when the fusible member is ruptured the stem is moved downwardly so that its lower end engages and holds said valve member against said seat, the lower end of said stem being tapering and the said valve spring having a part therearound.

4. A combined heat responsive and check valve structure comprising, a body having a passageway and a seat, a cap on said body, a valve member co-acting with said seat, a stem slidable in said cap having an upper threaded portion, a manually engageable member in threaded engagement with the threaded portion of said stem, a fusible member between said member and cap, a spring interposed between said cap and a part provided on said stem adapted to move said stem downwardly when said fusible member is ruptured whereby the lower end of said stem engages the valve member to hold the same on said seat, and a spring between said stem and valve member adapted to yield when said stem is in upper position whereby the valve member is yieldingly held on its seat.

5. A combined heat responsive shut-off and check valve comprising, a body having a passageway and a seat, a valve member co-acting with and normally resting on said seat, a cap on said body, a stem separate from said valve member reciprocable in said cap for engaging said valve member, means including a rupturable fusible member to hold said stem out of engagement with said valve member, and yielding means between said stem and valve member to yieldingly resist movements of said member away from said seat, and yielding means acting on said stem to move it into engagement with said valve member when said fusible member is ruptured and to hold said valve member on said seat.

JAMES P. RYAN.